United States Patent

Herbstman et al.

[11] Patent Number: 5,919,249
[45] Date of Patent: Jul. 6, 1999

[54] MULTIPLEXED OUTPUT MOVIE RENDERING

[75] Inventors: David F. Herbstman, Seattle; Lazarus I. Long, Bellevue, both of Wash.; David P. Simons, Lynnfield, Mass.

[73] Assignee: Adobe Systems Incorporated, San Jose, Calif.

[21] Appl. No.: 08/694,364

[22] Filed: Aug. 7, 1996

[51] Int. Cl.[6] .................................................. G06F 17/00
[52] U.S. Cl. ............................................................ 709/246
[58] Field of Search ......................... 395/200.66, 200.76; 345/473; 348/469

[56] References Cited

U.S. PATENT DOCUMENTS 5,517,652  5/1996  Miyamoto et al. ................ 395/200.76
5,638,518  6/1997  Malladi .............................. 395/200.66

Primary Examiner—Ellis B. Ramirez
Attorney, Agent, or Firm—Fish & Richardson P.C.

[57] ABSTRACT

A computer-implemented method and apparatus for rendering a composition where the user selects a composition to be rendered, a set of render settings and two or more different output format definitions to create output of two or more different formats. The composition is rendered according to the user-selected render settings to create master frames. The master frames are transformed according to each output format definition to create formatted frames in the selected output format.

17 Claims, 4 Drawing Sheets

5,919,249

MULTIPLEXED OUTPUT MOVIE RENDERING

BACKGROUND OF THE INVENTION

The present invention relates generally to methods and apparatus for rendering a composition including one or more pieces of footage into a final movie format, and more particularly to methods and apparatus capable of generating diverse output formats.

Programmed computers can be used to edit and create movies. For example, a computer program product called After Effects, available from Adobe Systems Incorporated of Mountain View, Calif., is licensed for use on a variety of personal computers and provides its user the ability to edit and create movies by integrating and arranging pieces of footage. In such programs, the process of creating a movie typically occurs in two major stages: modeling and rendering.

Modeling is the process of creating the structure for a movie project, commonly called a "composition", by defining the arrangement and timing of imported footage. A composition is essentially a set of instructions that define the processing of footage pieces in space and time in the formation of a movie. Each composition typically includes the definition of one or more layers, which are placeholders for pieces of footage. Modeling includes the sub-processes of: importing footage into the layers in a composition, editing the footage, arranging or "compositing" the various pieces of footage into an integrated whole, and finally adding any animation or other effects to the layers.

Imported footage may be in the form of digitized video, pictures, animations, drawings, stills or photographs. Each piece of imported footage is assigned to a layer. Layer properties may be individually edited by a user to control precisely any property over time. Layer properties that may be edited include the layer position, scale, rotation or opacity; the audio level; and the mask shape. For example, in editing a layer, a user can trim footage associated with the layer either spatially or temporally, or change the point from which a layer rotates.

Compositing integrates or combines the footage of the respective layers by using geometry masks, transparency information and effects. As the layers of the composition are integrated, animation and other effects may also be applied to each layer.

To create the final output, such as a film or videotape ready for viewing, the composition must be rendered. The rendering process transforms the footage and instructions associated with each layer into finished frames. During the rendering process, corresponding pixels from each layer are composited on top of each other to create a final image, a frame at a time, in the output format requested by the user. The frames may then be written for either analog or digital storage on a recording device such as a video tape recorder, photographic film recorder or digital disk recorder. In this way a movie is produced.

Typical render settings (i.e., user- or system-selected settings controlling some aspect of the rendering process) include the enablement (or disablement) of effects, the adjustment of resolution or quality of the frames, and frame manipulation settings associated with the final output format for the movie file.

SUMMARY OF THE INVENTION

In general, in one aspect, the invention provides a computer-implemented method and apparatus for rendering a composition where the user selects a composition to be rendered, a set of render settings and two or more different output format definitions that will result in the creation of output of two or more different formats. The composition is rendered according to the user selected render settings to create master frames. Thereafter, the master frames are transformed according to each output format definition to create formatted frames in the selected output format.

In one embodiment, user selections are stored in a queue for processing according to a user selectable order.

Advantages of embodiments of the invention include the following. The decoupling of the output formatting operation from the rendering operation allows for multiple output formats to be produced from a single rendered master frame resulting in significant time savings in the overall rendering process.

Other advantages and features will be apparent from the following description and from the claims.

DETAILED DESCRIPTION

Figure 1:
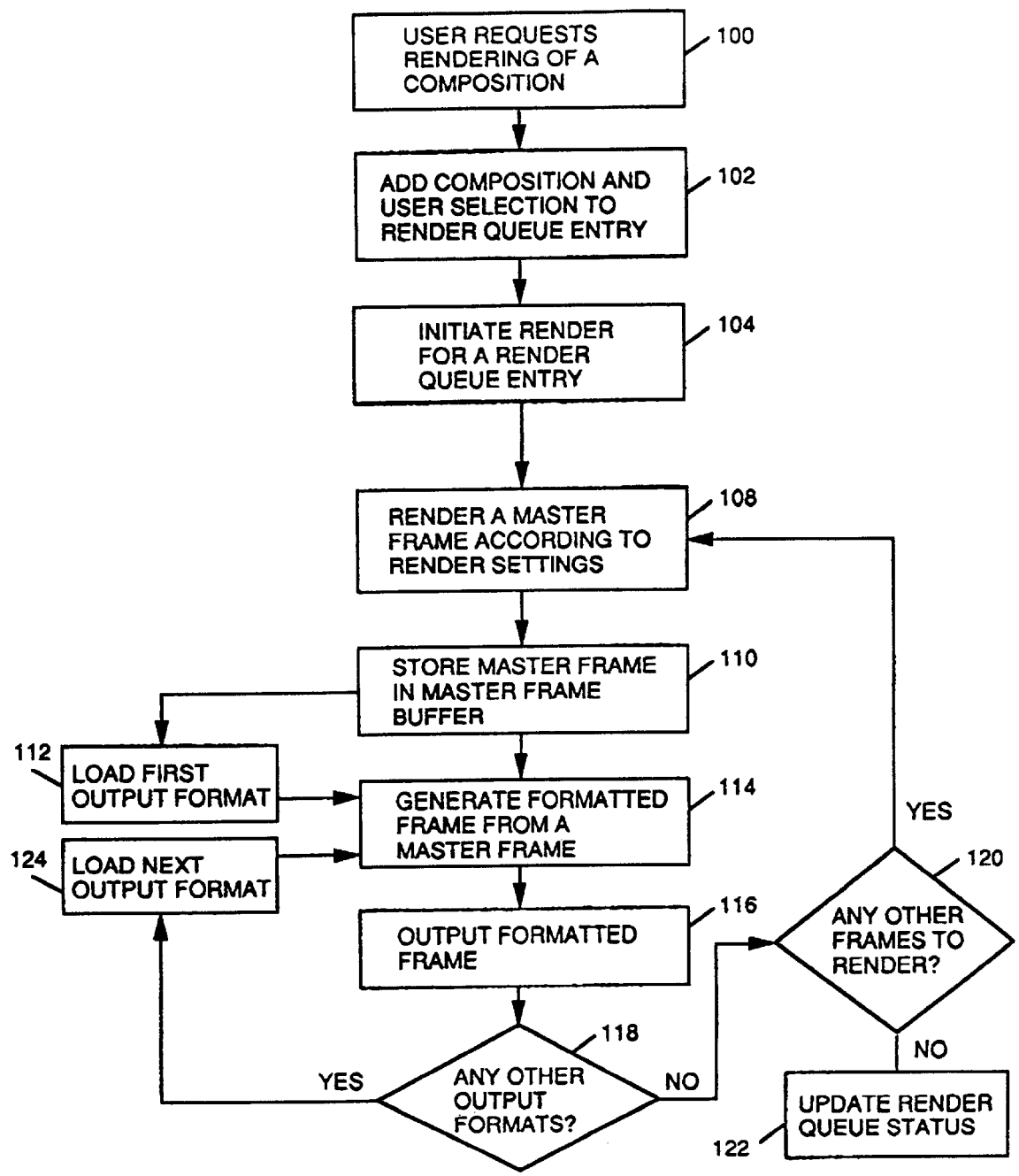
FIG. 1 is a flow chart of a multiplexed output rendering process of making movies according to the present invention.

Referring to FIG. 1, in a process of rendering a composition, an animation system adds the composition, render setting and output format information as an entry to a render queue (102), in response to a user request (100). A render queue entry includes fields that are used to store data associated with a composition, including identification, render settings, output formats, and status, as will be described later. The user request identifies the composition to be rendered and selects render settings and output formats (either pro-actively or by default). The output format field designates two or more different output formats. For convenience, the user may be provided a menu of templates with predefined settings from which the user may select render settings and output format templates.

The user may then initiate the rendering operation (104). Alternatively, the user may add another composition to the render queue (repeating steps 100 through 102) before the rendering process is initiated.

During the rendering process, the system generates a sequence of master frames for the composition according to the user-selected render settings (108, 120). Each master frame is stored in a master frame buffer (110). A master frame is rendered by compositing pixel by pixel the layers of the composition and processing the geometry and animation instructions associated with them.

Based on the output format selected by the user, the system loads a definition of a first output format (112). This definition may be in the form of a set of parameters defining the operation of an output sub-system; or alternatively, it may include a program to be executed to produce the form of output requested by the user. The system thereafter generates a formatted frame from the master frame according to the first output format definition (114). The output format defines the transformations to the master frame necessary to create the formatted frame for the particular output format requested by the user. For example, the master frame may be cropped, matted or stretched as indicated by the output format definition. Data compression may also occur at this stage. The system then writes the formatted frame to the selected output movie file (116).

Once the formatted frame is produced, the system checks to determine if other output formats have been requested (118). If not, then the system checks to determine if more frames need to be rendered for this queue entry (120). If so, then the system renders the next master frame and the process continues (108). If not, then the system sets a done bit in the render queue entry associated with the composition currently being processed to indicate that the request has been completed (122).

If the check at step 118 determines that more output formats have been designated, the system loads the next requested output format definition (124). Each additional format is processed by again generating a formatted frame from the master frame (114) in the master frame buffer according to the output format.

Figure 2:
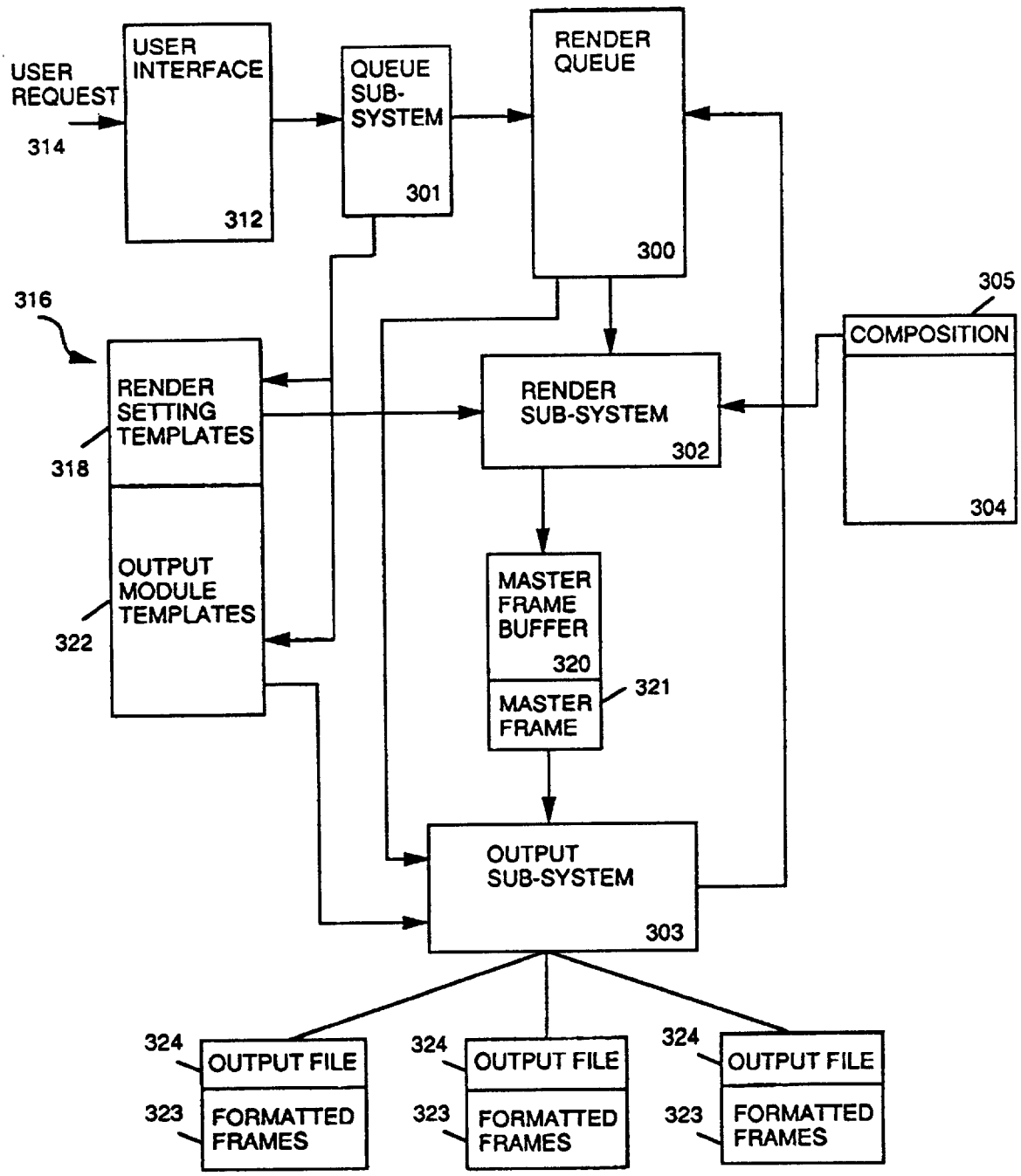
FIG. 2 is a schematic block diagram of a system for rendering a composition according to the present invention.

Referring to FIG. 2, a system for rendering compositions and outputting multiple output format movie files includes a render queue 300, a queue sub-system 301, a render sub-system 302, an output sub-system 303 and a memory 304 for storing one or more compositions 305.

Figure 3:
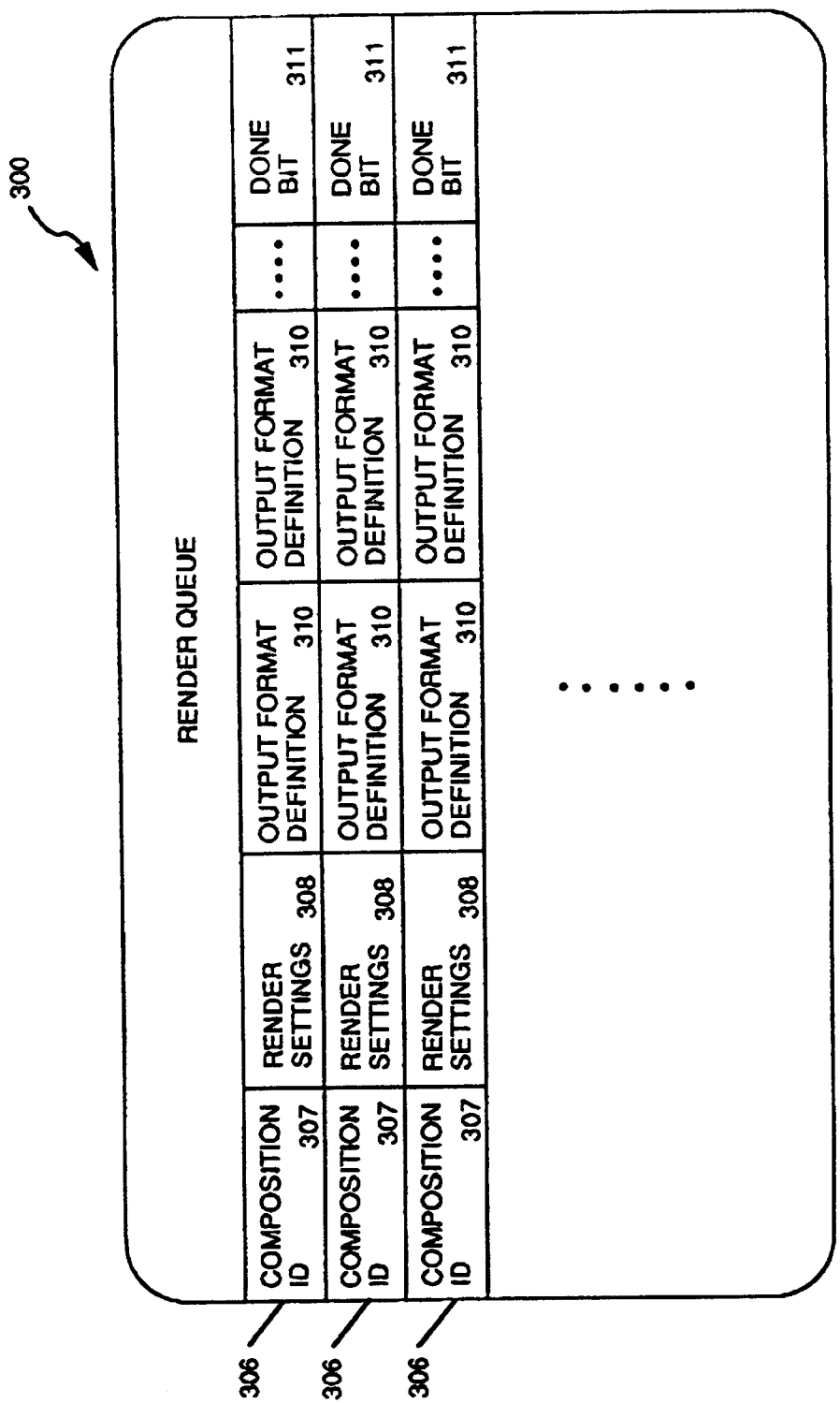
FIG. 3 is a data structure for a render queue.

Referring to FIG. 3, render queue 300 stores composition identifiers and associated information, one entry 306 for each rendering request. Each entry 306 includes a composition identifier 307, render settings 308, two or more output format definitions 310, and a done bit 311. Composition identifier 307 identifies the composition 305 (FIG. 2) that is to be rendered. Render settings 308 may be in the form of an identifier that points to a template containing render settings stored in memory 316, or alternatively may be particularized settings for use with a default template. For example, certain ones of the available user configurable render settings may be designated by the user through user interface 312 and stored in render queue 300 in the render settings 308 field. These custom settings may be used in conjunction with other settings defined in a default template for determining the complete set of render settings to be used to render the composition. Similarly, output format definitions 310 may be of the form of identifiers for pointing to particular output module templates having predetermined output format settings or may also be of the form of particularized settings for use with a default output module template. The use and function of render settings 308, output format definitions 310 and done bit 311 will be described below.

Referring again to FIG. 2, a user interacts with, and controls, the system by using a conventional user interface 312. The user schedules a composition for rendering by providing a user request 314 to user interface 312. User request 314 identifies a composition for rendering and may include priority information for ordering the rendering, and render setting and output format information. The user request information is provided to queue sub-system 301, a program module that creates, edits, and deletes entries in render queue 300, as appropriate.

In one embodiment, user request 314 provided to user interface 312 includes one or more custom render setting values. Queue sub-system 301 loads these custom render setting values into a custom template and assigns a unique identifier to the custom configuration. Thereafter the custom template is stored in memory 316, until retrieved by render module 302. The configurable render settings include quality; resolution; proxy use; effects; frame blending; field render; 3:2 pull down; motion blur; shutter angle; use storage overflow; time span; start, end and duration; frame rate; and skip settings.

The quality setting determines the quality setting for all layers. In one embodiment the quality settings include wireframe, draft, and best quality.

Resolution determines the size and clarity of the rendered composition relative to the original composition dimensions. The resolution setting determines the final effective frame size.

Proxy use determines whether proxies will be used when rendering. Proxies are representations of footage items in outline form. Proxies allow for quicker rendering of compositions by eliminating the need to manipulate the pixel data for a piece of footage.

Effects determines what effects are enabled for the rendered composition. For example, animation effects and plug-in effects can be disabled to speed up the rendering process. Each effect in a layer can be enabled independently. A user may choose to use current settings (for the individual effects) or turn all effects on or off.

Frame blending determines the frame blending settings for all layers. Frame blending allows a user to take footage having one frame rate and incorporate it into a composition at a different frame rate. Rather than dropping or adding frames, frames are blended to accommodate the differences in the frame rates. The process of blending frames is described in more detail in commonly owned copending application entitled "Controlling Time in Digital Compositions" to David Simons et al., filed Aug. 7, 1996, which is expressly incorporated herein by reference.

Field render determines the field rendering technique use for the rendered composition. Field rendering, as used in television productions, produces two fields from every frame.

The 3:2 pull down setting determines the phase of the 3:2 pull down introduction. The 3:2 pulldown setting enables smooth transitions when converting from film to video frame rates (24 to 30 frames a second).

The motion blur setting determines if motion blur is applied.

Shutter angle affects the amount of motion blur.

Use storage overflow determines whether rendering continues when the first assigned storage volume overflows.

Time span indicates how much of the composition is to be rendered. Time span can be set to indicate all or part of the composition by the use of work area markers.

Start, end and duration settings adjust the time span in which frames will be rendered. Users can designate the starting position in a composition at which rendering will begin and either an end time or a duration.

The frame rate determines the sampling frame rate used to render the composition.

The skip function, when selected, lets a user render part of a sequence of files without rerendering previously rendered frames. The skip function is used when the output format designated includes multiple sequences of output files.

Alternatively, user request 314 may designate a predefined set of render settings (a template) from an available set of render setting templates, or a default template will be designated by the queue module.

User request 314 provided to user interface 312 may include one or more custom output format definitions. The custom output format information may be stored in render queue 300. Alternatively, queue sub-system 301 may load the custom output format information into a custom template and assign a unique identifier to the custom configuration. Thereafter, the custom template may be stored in memory 316, until retrieved by output sub-system 303. The output format parameters that are user configurable include format, import, format options, channels, depth, color, stretch, crop, and audio output setting.

The format setting lets a user select a format for the output or sequence of files. File formats include QuickTime, PICT, ElectricImage, and Photoshop. File types may easily be added using plug-in output format modules.

The import setting, when selected, will import the rendered movie back into the current project.

Format options provide format-specific information for each of the output formats described above. For example, the QuickTime format has options for choosing the compression type and quality. Each format includes a number of format-specific options.

The channels setting specifies the video output channels to be contained in the output movie file. For example, only the RGB channel may be designated, or alpha channel information may also be included in the output file.

Depth specifies the color depth of the rendered movie. A user can choose the number of colors or shades of gray.

Color specifies how colors are created with the alpha channel. Selections include pre-multiplied (with black) or straight (unmatted).

The stretch setting allows the user to change the size of the rendered movie.

The crop setting lets the user trim or add pixels to the edges of the rendered movie. This setting allows the user to specify the number of pixels to be added or subtracted from the top, left, bottom or right sides of the movie.

The audio output setting lets users set the audio sample rate, from 5.564 to 48.048 khz, for example; the sample depth, to 8 or 16 bits, for example; and the playback format, to mono or stereo, for example.

Compression can reduce the data size of output file 324.

Alternatively, user request 314 may designate an output format definition from an available set of output module templates stored in memory 316, or a default template will be designated by the queue sub-system. Each output format definition includes options for the specific video and audio output format in which a movie will be produced, as well as compression options. In one embodiment, output module templates for five modes are available in storage device 316: lossless, millions plus pictures (full color, full size, no audio, and no compression), audio only, alpha only (alpha channel only), and Cinepak with audio.

When an entry 306 (FIG. 3) in render queue 300 is selected (e.g., has reached the top of the queue), render sub-system 302 retrieves the composition identifier 307 and render settings 308 from the render queue entry 306. Render module 302 retrieves from memory 304 the composition 305 indicated by composition identifier 307.

Render settings 308 may map to a predefined render setting template 318 stored in memory 316 associated with render sub-system 302. Alternatively, render settings 308 may itself contain the render settings, or it may point to a custom render setting template created for the composition. Render sub-system 302 retrieves the information as indicated by render settings 308.

The rendering process performs the layering (overlap) of the imported footage and processes geometry and animation effects associated with the composition. During the rendering process, the composition is manipulated based on the selected render settings. Render sub-system 302 composites pixels for each layer in the composition, creating a final image a master frame at a time. Each master frame is stored in a master frame buffer 320. Master frame buffer 320 is sized to hold one or more frames. In one embodiment, master frame buffer 320 is sized to hold only a single frame, and output formatting operations (by output sub-system 303) are completed before the generation of a new master frame. When a master frame is stored in master frame buffer 320, output sub-system 303 is enabled to begin output formatting. Alternatively, master frame buffer may be implemented as a disk file, for example, to hold a substantial number of master frames, so that rendering can be completed before output formatting is begun.

Output sub-system 303 receives as inputs a master frame from master frame buffer 320 and the two or more output format definitions 310 from render queue 300 for the render item. Each output format definition 310 may map to a predefined module template 318 stored in memory 316 associated with output sub-system 303. Alternatively, output format definition 310 may itself contain the output format information, or it may point to a custom output module template created for the composition. Output subsystem 303 retrieves the output format information as indicated by output format definition 310 received from render queue 300.

Output sub-system 303 generates a formatted frame 323 from the master frame for each output format definition 310 designated. The formatted frames are stored in corresponding output files 324. In one embodiment, the render process is accomplished serially. A single master frame is produced according to the render settings and stored in the master frame buffer. Thereafter a formatted frame is produced from the master frame according to each output format definition. When the last formatted frame has been produced, the master frame buffer is cleared, and the render settings are used to create the next master frame in the sequence. Alternatively, the render process may be accomplished in parallel, in a system which operates more than one processor at a time. Specifically, the creation of formatted frames from the master frame based on the output format definitions may be performed in parallel once the rendering subprocess is complete.

In one embodiment, the output formatting is initiated each time a master frame is produced. Alternatively, the output formatting may be delayed until all of the master frames have been constructed and stored in the master frame buffer.

Output sub-system 303 is capable of accepting one or more plug-in modules, each of which may include an output module template. Accordingly, depending on the output format indicated by a user's output format definition 310, various ones of the plug-in modules templates are used to construct master frames. Each enabled plug-in module provides output format information to output sub-system 303 which may be used in creating a formatted frame from the master frame for storage in an output file.

The invention may be implemented in hardware, firmware or software, or a combination of the three. Preferably the invention is implemented in a computer program for a programmable computer having a processor, a data storage system, volatile and non-volatile memory and/or storage elements, at least one input device and at least one output device.

Figure 4:
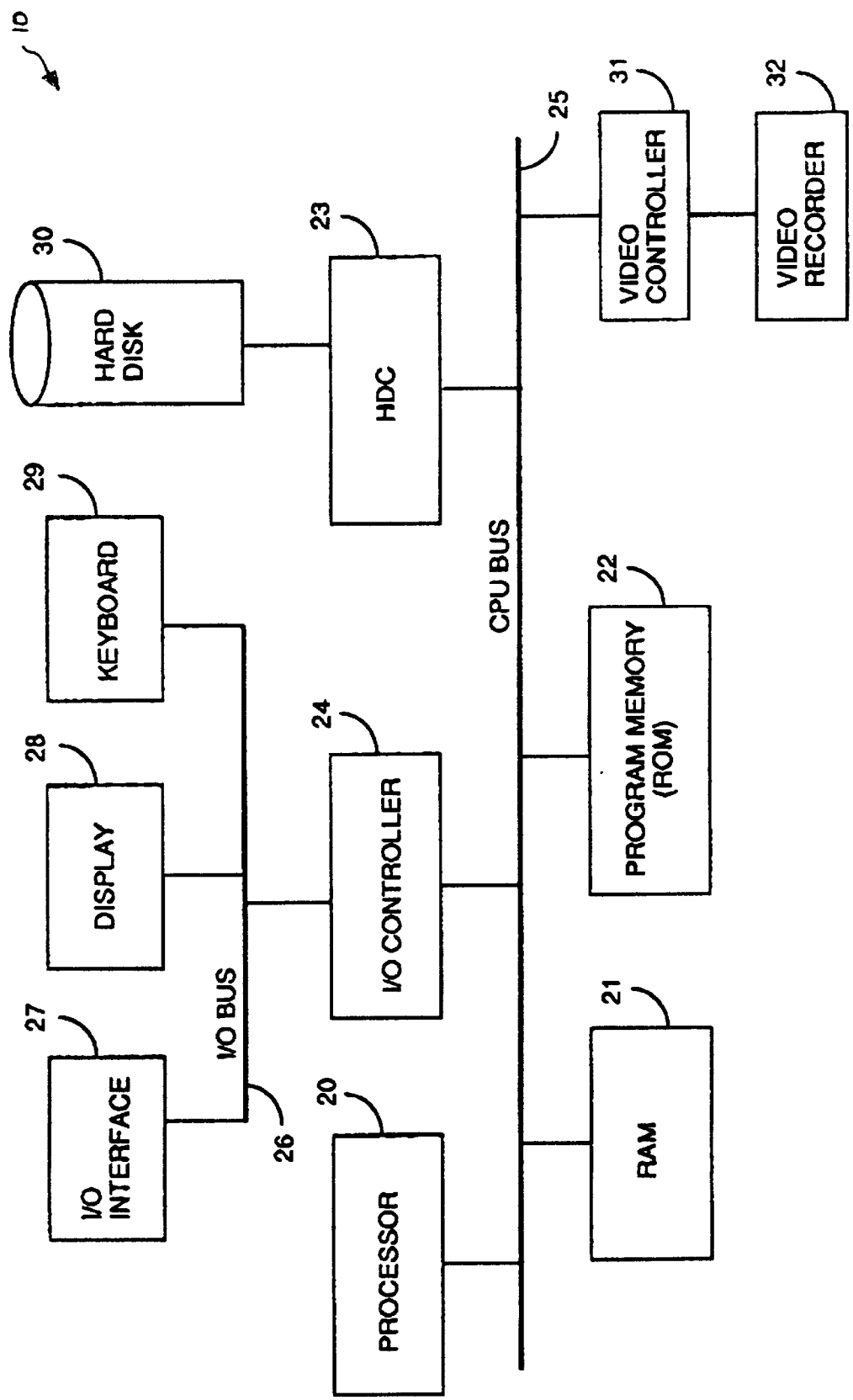
FIG. 4 is a schematic block diagram of a programmable computer suitable for executing computer programs according to the present invention.

By way of example, FIG. 4 shows a block diagram of a programmable processing system 10. Programmable processing system (computer) 10 preferably includes a processor 20, random access memory (RAM) 21, a program memory 22 (preferably a writable read-only memory (ROM) such as a flash ROM), a hard drive controller 23, video controller 31 and an input/output (I/O) controller 24 coupled by a CPU bus 25.

Hard drive controller 23 is coupled to a hard disk 30, which may be used for storing application programs, such as After Effects, and data including video. Video controller 31 is coupled to video recorder 32, which may be used for storing and importing video footage and for writing final output. I/O controller 24 is coupled by means of an I/O bus 26 to an I/O interface 27. I/O interface 27 receives and transmits data (e.g., stills, pictures, movies, and animations for importing into a composition) in analog or digital form over communication links such as a serial link, local area network, wireless link, and parallel link. Also coupled to I/O bus 26 is a display 28 and a keyboard 29. Alternatively, separate connections (separate buses) may be used for I/O interface 27, display 28 and keyboard 29. System 10 may be preprogrammed or it may be programmed (and reprogrammed) by loading a program from another source (e.g., a floppy disk, CD-ROM, or another computer).

Each computer program is preferably stored in a storage media or device (e.g., program memory 22 or a magnetic disk) readable by a general or special purpose computer, for configuring and operating the computer when the storage media or device is read by the computer to perform the procedures described in this specification. The invention may also be considered to be implemented as a computer-readable storage medium, configured with a computer program, where the storage medium so configured causes a computer to operate in a specific and predefined manner to perform the steps of the invention.

Other embodiments are within the scope of the following claims.

The present invention has been described in terms of specific embodiments, which are illustrative of the invention and not to be construed as limiting.

What is claimed is:

1. A computer-implemented method for rendering a composition to create output of two different formats, comprising the steps of:
   receiving a set of render settings for the composition;
   receiving first and second different output format definitions for the output;
   rendering the composition according to the render settings to create master frames;
   storing the master frames in a master frame buffer; and
   generating a first formatted frame by transforming each master frame according to the first output format definition and generating a different, second formatted frame by transforming each master frame according to the second output format definition.

2. The method of claim 1 wherein the first and second output formats are selected from the group of QuickTime, PICT, ElectricImage, and Photoshop formats.

3. The method of claim 1 further comprising the step of retrieving one or more output format definitions from a plug-in module.

4. The method of claim 1 further including the step of outputting the formatted frames into a plurality of output files according to the respective output formats.

5. The method of claim 4 wherein the outputting of formatted frames occurs in parallel.

6. The method of claim 1 wherein all of the master frames for a given composition are created and stored prior to the generation of formatted frames.

7. The method of claim 1 further including the steps of storing a master frame in the master frame buffer only until the first and second formatted frames are generated, and thereafter deleting the master frame from the master frame buffer.

8. The method of claim 1 wherein the generation of formatted frames begins after the first master frame is stored in the master frame buffer.

9. The method of claim 8 wherein first and second formatted frames are produced in parallel from a single master frame.

10. A method of rendering a composition to create a plurality of output files of differing formats from the same rendered composition comprising the steps of:
    receiving a selection of render settings;
    receiving a separate selection of a plurality of output formats;
    rendering the composition according to the render settings to create a master frame;
    formatting the master frame to create formatted frames according to each of the plurality of output formats; and
    storing the formatted frames in output files corresponding to their respective output format.

11. A computer program for rendering a composition to create two or more output files, the computer program being stored on a media readable by a computer system, for configuring the computer system upon being read and executed by the computer system to perform the steps of:
    rendering the composition to create one set of master frames according to a set of render settings; and
    generating two different sets of formatted frames from the master frames according to two different output formats.

12. The computer program of claim 11 further configured to perform the steps of:
    accepting a set of user selectable render settings; and
    accepting two user selectable output formats for creating two output files of differing formats.

13. The computer program of claim 11 further configured to perform the step of providing an output file including the formatted frames according to each user selectable output format.

14. A computer program tangibly embodied on a computer-readable medium, comprising instructions for causing a computer to:
    render the composition to create one set of master frames according to a set of render settings; and
    generate two different sets of formatted frames from the master frames according to two different output formats.

15. A system for rendering a composition to create a plurality of output files of differing formats from the same rendered composition responsive to a user request to render the composition comprising:

a render module that processes the composition according to the request to produce master frames;

a master frame buffer coupled to store the master frames produced by the render module; and an output module coupled to receive as inputs master frames from the master frame buffer, the output module generating two sets of formatted frames from the master frames, one set according to each output format.

16. The system of claim 15 further including a render queue for storing the requests.

17. The system of claim 15 wherein the output module further includes a plug-in module interface for receiving a user designatable plug-in module including output format information, the plug-in module providing output format information to the output module through the plug-in module interface for generating a formatted frame according to its output format information when the plug-in module output format is designated by the user.

* * * * *